United States Patent
Gibson et al.

(10) Patent No.: US 7,131,032 B2
(45) Date of Patent: Oct. 31, 2006

(54) METHOD, SYSTEM, AND ARTICLE OF MANUFACTURE FOR FAULT DETERMINATION

(75) Inventors: Gavin G. Gibson, Westminster, CO (US); Todd H. McKenney, Broomfield, CO (US); Christian Cadieux, Louisville, CO (US); Paula C. Kiser, Golden, CO (US)

(73) Assignee: Sun Microsystems, Inc., Santa Clara, CA (US)

( * ) Notice: Subject to any disclaimer, the term of this patent is extended or adjusted under 35 U.S.C. 154(b) by 583 days.

(21) Appl. No.: 10/389,642

(22) Filed: Mar. 13, 2003

(65) Prior Publication Data

US 2004/0181709 A1   Sep. 16, 2004

(51) Int. Cl.
*G06F 11/00* (2006.01)

(52) U.S. Cl. .......................... 714/26; 714/47; 714/704; 702/187

(58) Field of Classification Search .................. 714/26, 714/47, 704; 702/187, 176
See application file for complete search history.

(56) References Cited

U.S. PATENT DOCUMENTS

| | | | |
|---|---|---|---|
| 5,448,722 A | 9/1995 | Lynne et al. | |
| 5,574,856 A | 11/1996 | Morgan et al. | |
| 5,664,093 A | 9/1997 | Barnett et al. | |
| 5,923,247 A * | 7/1999 | Dowden et al. | 340/506 |
| 6,006,016 A * | 12/1999 | Faigon et al. | 714/48 |
| 6,239,699 B1 * | 5/2001 | Ronnen | 340/517 |
| 6,249,887 B1 | 6/2001 | Gray et al. | |
| 6,324,659 B1 | 11/2001 | Pierro | |
| 6,353,902 B1 | 3/2002 | Kulatunge et al. | |
| 6,414,595 B1 | 7/2002 | Scrandis et al. | |
| 6,442,694 B1 | 8/2002 | Bergman et al. | |
| 6,460,070 B1 | 10/2002 | Turek et al. | |
| 6,499,117 B1 | 12/2002 | Tanaka | |
| 6,587,960 B1 | 7/2003 | Barford et al. | |
| 6,889,169 B1 * | 5/2005 | Kirshenbaum et al. | 702/187 |
| 6,928,556 B1 * | 8/2005 | Black et al. | 713/400 |
| 6,966,015 B1 * | 11/2005 | Steinberg et al. | 714/47 |
| 2002/0087578 A1 * | 7/2002 | Vroman | 707/104.1 |
| 2002/0144193 A1 | 10/2002 | Hicks et al. | |
| 2002/0194524 A1 | 12/2002 | Wiley et al. | |
| 2003/0028823 A1 * | 2/2003 | Kallela et al. | 714/26 |
| 2003/0074471 A1 | 4/2003 | Anderson et al. | |
| 2004/0015737 A1 * | 1/2004 | Martin et al. | 714/26 |
| 2004/0098223 A1 * | 5/2004 | Conrad | 702/176 |

OTHER PUBLICATIONS

"*Diagnostics Validation & Verification*," pp. 1-12 [online] [retrieved on Sep. 25, 2003] Retrieved from http://www.giordano.com/Help/Sect8.htm.

Qualtech Systems, Inc. "*Diagnostic Modeling of a Data Bus System TEAMS 4.0*," by Somnath Deb, pp. 1-13 [online] Retrieved from http://www._teamqsi.com/doc/1553-report.pdf.

(Continued)

*Primary Examiner*—Robert Beausoliel
*Assistant Examiner*—Marc Duncan
(74) *Attorney, Agent, or Firm*—Meyertons Hood Kivlin Kowert & Goetzel, P.C.; B. Noël Kivlin (57) ABSTRACT

Provided are a method, system and article of manufacture for fault determination. A duration of time is determined for receiving an event. A plurality of events are received in a time period that is at least twice the determined duration. A plurality of factors are determined corresponding to the plurality of events. At least one factor is determined from the plurality of factors, wherein the at least one factor is a cause of at least one of the plurality of events.

27 Claims, 11 Drawing Sheets

OTHER PUBLICATIONS

U.S. Appl. No. 10/172,303, filed on Jun. 13, 2002, entitled "*System and Method for Rapid Fault Isolation in a Storage Area Network,*" by S. A. Wiley; W. Munson; and C. Cadieux.

U.S. Appl. No. 10/172,302, filed on Jun. 13, 2002, entitled "*System and Method for Isolating Faults in a Network*" by S. A. Wiley; J. S. Schell; and C. Cadieux.

* cited by examiner

Event to potential factors mapping table — 300

| Event — 400 | Potential factor list — 402 |
|---|---|
| Event 204a | Factor 200f, Factor 200g |
| Event 204b | Factor 200c, Factor 200d |
| Event 204c | Factor "Host B is down" |
| Event 204d | Factor "Host B is down" |
| ⋮ | ⋮ |
| Event 204r | Factor 200a |

404 — Event 204b
406 — Event 204c
408 — Event 204d

METHOD, SYSTEM, AND ARTICLE OF MANUFACTURE FOR FAULT DETERMINATION

BACKGROUND OF THE INVENTION

1. Field of the Invention

The present invention relates to a method, system, and an article of manufacture for fault determination.

2. Description of the Related Art

Distributed networks, such as, storage area networks (SANs) and local area networks (LANs), may comprise a plurality of interconnected components. SAN components, such as, application hosts, fiber channel switches, and storage devices may form the networked environment of a distributed network. Faults in such networked environments are determined by monitoring characteristics of the components that comprise the networked environment and the connections between the components.

A single fault occurring in a distributed network may propagate failures from one component of the distributed network to another and a plurality of components in the distributed network may generate a plurality of events as a result of the single fault. A determination may be made of the plurality of events that occur in the distributed network.

SUMMARY

Provided are a method, system and article of manufacture for fault determination. A duration of time is determined for receiving an event. A plurality of events are received in a time period that is at least twice the determined duration. A plurality of factors are determined corresponding to the plurality of events. At least one factor is determined from the plurality of factors, wherein the at least one factor is a cause of at least one of the plurality of events.

In certain implementations, the duration is a first duration, and at least one time window of a second duration is selected, wherein the second duration is at least twice the first duration. The received plurality of events are identified in the at least one time window. In certain other implementations, at least two successive time windows are selected, wherein each time window is at least of the duration. The received plurality of events are identified in the at least two successive time windows.

In further implementations, the received plurality of events are assigned timestamps. The timestamped events are recorded in a database. Events from the database are retrieved in at least one time window, wherein the at least one time window is of a second duration, wherein the second duration is at least twice the first duration.

In additional implementations, determining the plurality of factors further comprises retrieving from a mapping data structure one list of factors corresponding to at least one event in the received plurality of events. In yet additional implementations, determining the at least one factor further comprises determining the at least one factor that is common to the received plurality of events.

In certain implementations, the plurality of events are faults generated by factors in a network, wherein the receiving and determinations are performed by a monitoring application implemented in a computational device coupled to the network.

The implementations determine a factor that is the root cause for a fault that occurs in a network. The implementations can isolate the factor that is the root cause even when multiple events are generated by the components of a network as a result of a single fault.

BRIEF DESCRIPTION OF THE DRAWINGS

Referring now to the drawings in which like reference numbers represent corresponding parts throughout.

DETAILED DESCRIPTION

In the following description, reference is made to the accompanying drawings which form a part hereof and which illustrate several implementations. It is understood that other implementations may be utilized and structural and operational changes may be made without departing from the scope of the present implementations.

Figure 1:
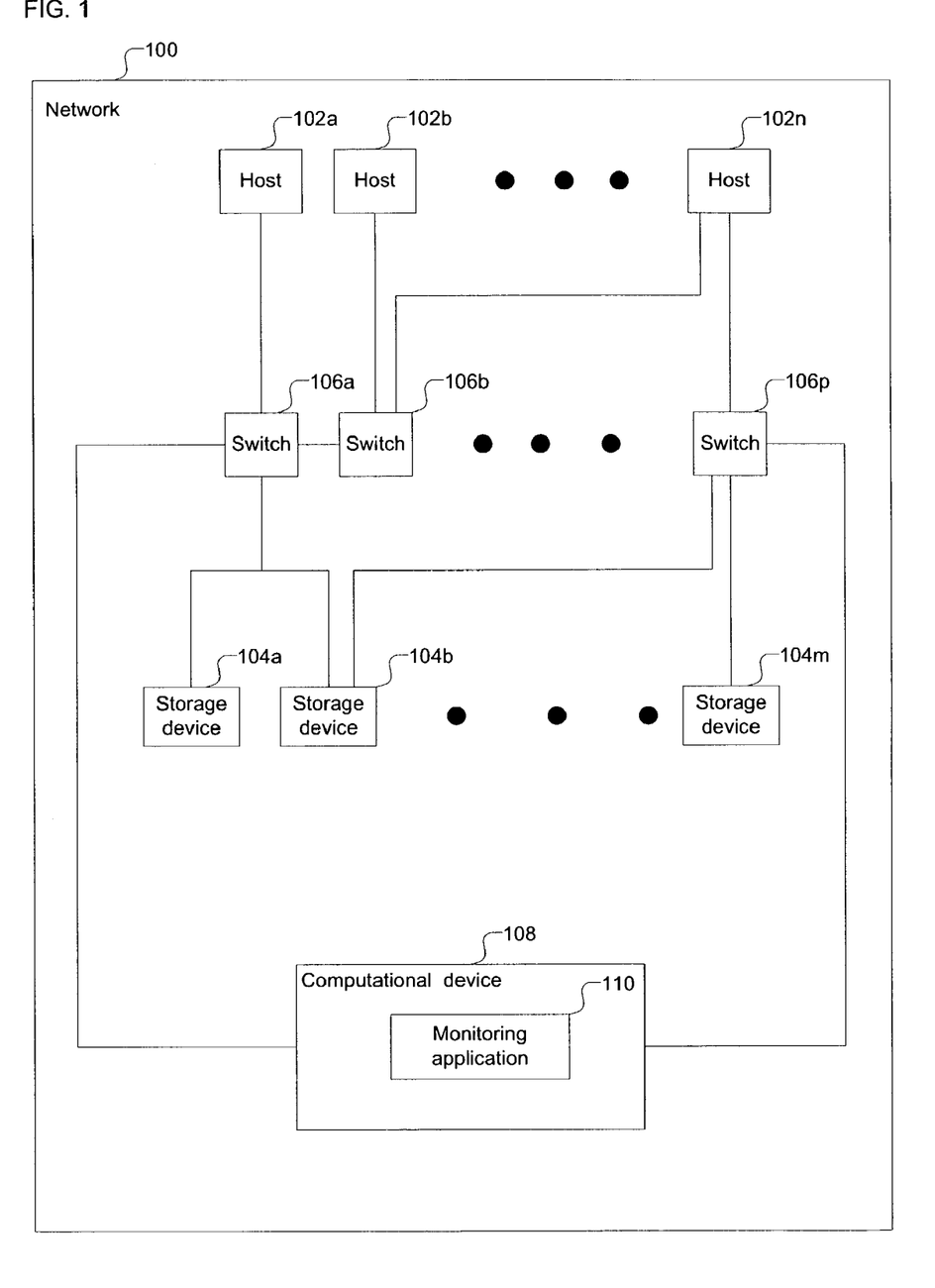
FIG. 1 illustrates a block diagram of a computing environment, in accordance with certain described aspects of the invention.

FIG. 1 illustrates a block diagram of a computing environment, in accordance with certain described aspects of the invention. A network 100 comprises a plurality of components, such as, hosts 102a . . . 102n, switches 106a . . . 106p, storage devices 104a . . . 104m, a computational device 108, etc. The network 100 may include additional components implemented either in hardware or software. The components may generate events, including faults, that may be received and monitored by a monitoring application 110 included in the computational device 108.

FIG. 1 shows the computational device 108 as distinct from the hosts 102a . . . 102n. In alternative implementations the computational device 108 may be one of the hosts 102a . . . 102n. In yet additional implementations the monitoring application 110 may be in one of the hosts 102a . . . 102n.

The hosts 102a ... 104n are coupled to a plurality of storage devices 104a ... 104m via a plurality of switches 106a ... 106p. A switch 106a ... 106p may couple one or more hosts 102a ... 104n to one or more storage devices 104a ... 104m. The hosts 102a ... 104n and the storage devices 104a ... 104m may be connected by components other than the switches 106 ... 106p.

The hosts 102a ... 102n, and the computational device 108 may comprise any computational device known in the art, such as a personal computer, a workstation, a server, a mainframe, a hand held computer, a palm top computer, a telephony device, a network appliance, etc. The storage devices 104a ... 104m may comprise any storage devices known in the art, such as direct access storage devices (DASD), tape drives, etc. The switches 104a ... 104p may comprise any type of network switch known in the art.

The network 100 comprising the hosts 102a ... 102n, the computational device 108, the storage devices 104a ... 104m, and the switches 106a ... 106p may be any network known in the art, such as the Internet, an intranet, a Local area network (LAN), a Storage area network (SAN), a Wide area network (WAN), a wireless network, etc. The network 100 may be part of one or more larger networks or may be an independent network or may be comprised of multiple interconnected networks. The hosts 102a ... 102n, the computational device 100, the switches 106a ... 106p, and the storage devices 104a ... 104m may alternatively be connected without a network, such as through direct lines, common bus systems, etc., in a manner known in the art.

Therefore, FIG. 1 shows a monitoring application 110 that monitors faults generated by a plurality of components, including hosts 102a ... 102n, storage devices 104a ... 104m, and switches 106a ... 106p.

Figure 2:
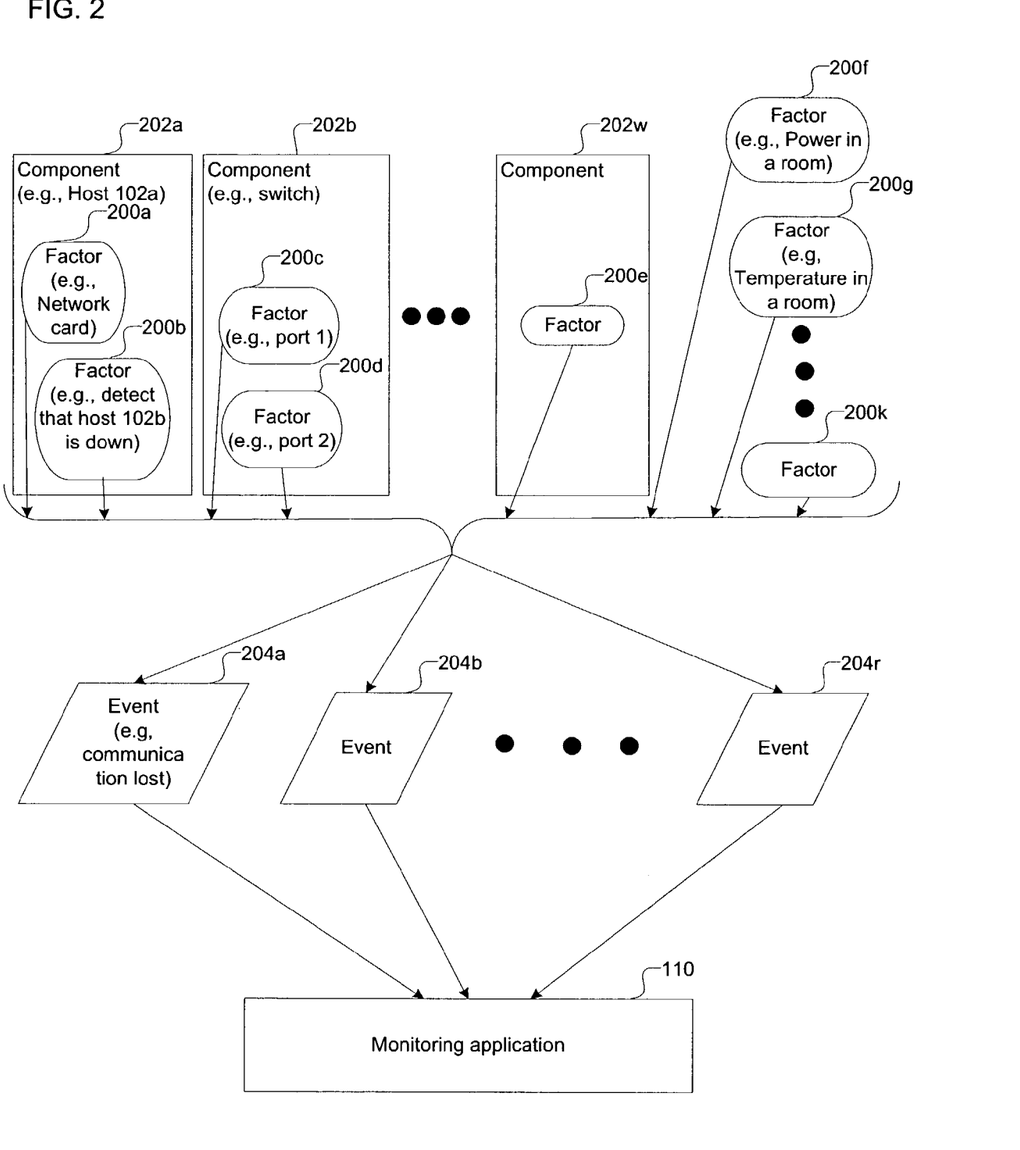
FIG. 2 illustrates a block diagram of components, factors, and events, in accordance with certain described implementations of the invention.

FIG. 2 illustrates a block diagram of components, factors, and events associated with the network 100, in accordance with certain described implementations of the invention. A plurality of factors 200a ... 200k may be associated with the network 100. A factor 200a ... 200k may include any phenomenon in the network 100 including any potential reason for a fault generated in the network 100.

Some factors 200a ... 200e may be associated with a specific component of a plurality of components 202a ... 202w, other factors 200f ... 200k may be environmental factors that are not associated with any particular component of the plurality of components 202a ... 202w, while still other factors included in the factors 202a ... 202k may reflect a phenomenon in the network 100.

For example, factor 200a is a network card included in component 202a, where the component 202a is the host 102a. A fault in the network 100 may be caused by the network card comprising the factor 200a because of a defect in the hardware or software of the network card. Replacing the network card may remove the factor 200a as the cause of a fault. Therefore, a factor may be a replaceable component in the network 100.

In another example, a factor may be an environmental factor. For example, factor 200f may be the power in the room housing the network 100, where a fault in the network 100 may be caused by fluctuations in the power in the room, i.e., factor 200r is an environmental factor. Other environmental factors may include factors such as the temperature in a room indicated as factor 200g. The environmental factors 200f ... 200k may be changed to correct a fault. For example, the temperature in a room represented as factor 200g may be set to a correct temperature so that the network 100 does not generate faults as a result of inappropriate temperature.

The factors 200a ... 200k may also be a phenomenon in the network 100. For example, consider three hosts A, B, and C in the network 100 where host A is coupled to host B and host B is coupled to host C. Host A may generate an event indicating a fault in host B and host C may generate an event indicating a fault in host B, thereby allowing the monitoring application 110 to conclude that host B is a root cause of a failure in the network 100. For example, in FIG. 2, factor 200b indicates the detection of host 102b being down. As a result of factor 200b a corresponding event may be generated for the monitoring application 110.

The monitoring application 110 receives a plurality of events 204a ... 204r caused by the plurality of factors 200a ... 200k, where the plurality of events 204a ... 204 may comprise faults generated in the network 100. In certain implementations, a single fault is the root cause for the plurality of events 204a ... 204r in the network 100. A single fault in the network 100 may propagate errors from one component of the network 100 to another and generate the plurality of events 204a ... 204r. An event 204a ... 204r may be associated with a factor 200a ... 200k. For example, the monitoring application 110 may receive an event 204a that communication is lost with the component 202b, where the component 202b is a switch. The implementations may determine that the communication is lost with the component 202b because of factor 200c, where the factor 200c is port 1 of the switch comprising the component 202b.

Therefore, FIG. 2 describes an implementation where the monitoring application 110 receives a plurality of events 204a ... 204r caused by a plurality of factors 200a ... 200k, where a factor is any phenomenon associated with the network 100 that may cause an event that is detected by the monitoring application 110. The plurality of events 204a ... 204r may be generated from a single fault that occurs in the network 100.

Figure 3:
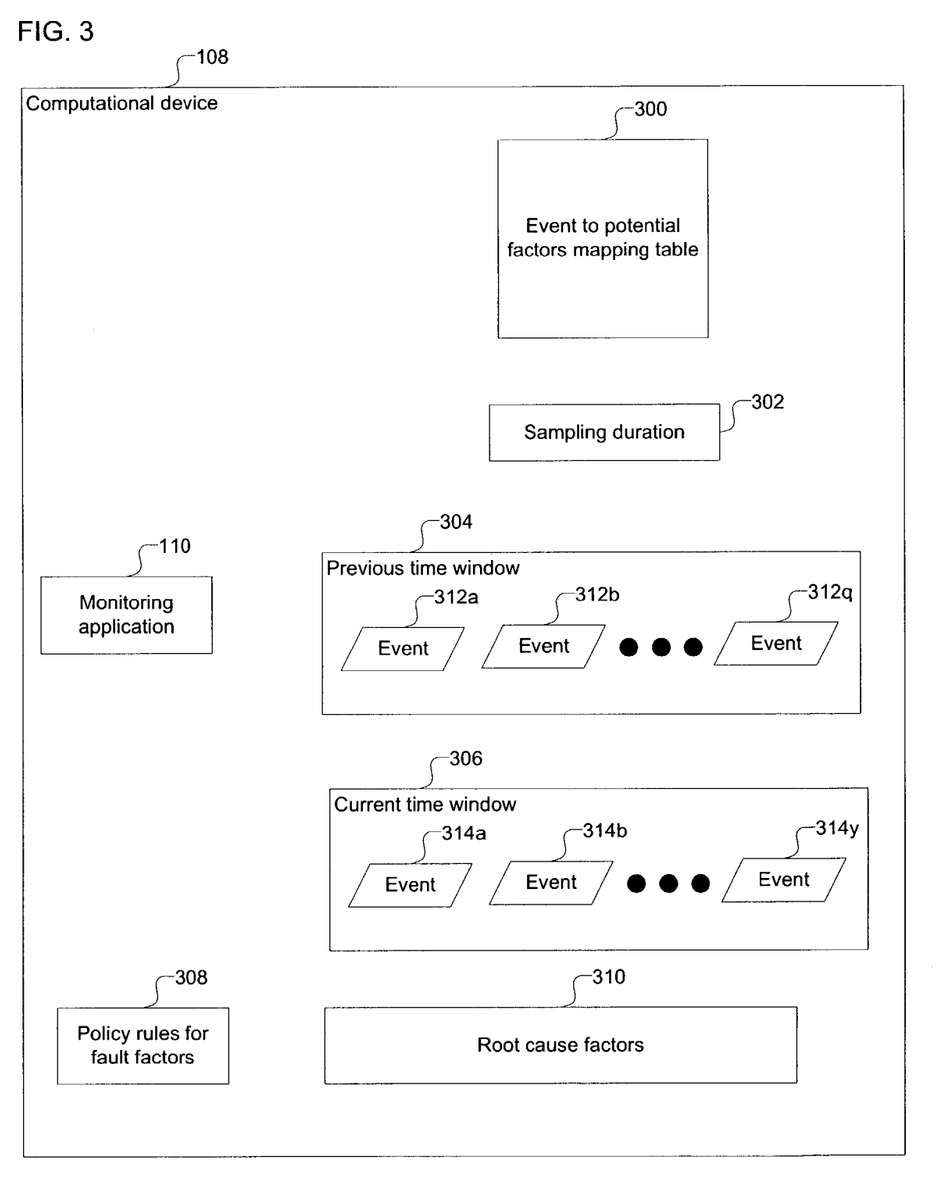
FIG. 3 illustrates a block diagram of data structures coupled to a monitoring application, in accordance with certain described implementations of the invention.

FIG. 3 illustrates a block diagram of data structures coupled to the monitoring application 110, in accordance with certain described implementations of the invention. Coupled to the monitoring application 110, where the monitoring application 110 is implemented in the computational device 108, are data structures for an event to potential factors mapping table 300, a sampling duration 302, a previous time window 304, a current time window 306, policy rules for fault factors 308, and root cause factors 310.

The event to potential factors mapping table 300 is a table that includes mappings of the events 204a ... 204r to the factors 200a ... 200k. For an event 204 ... 204r, the event to potential factors mapping table 300 indicates the one or more factors selected from the factors 200a ... 200k that may potentially cause the event 204a ... 204r. For example, the event to potential factors mapping table 300 may indicate that event 204a may be caused by any of the factors 200a, 200e, and 200g.

The sampling duration 302 represents the maximum time interval within which an event 204a ... 204r is generated in the network 100. In a representative network, such as the network 100, some components may generate events 204a ... 204r faster than others. For example, the switches 106a ... 106p may generate an event 204a ... 204r faster than the hosts 102a ... 102n in implementations where the hosts 102a ... 102n try to recover from an error condition before generating an event 204a ... 204r or in implementations where the hosts 102a ... 102n do not generate an event until a software component in the hosts 102a ... 102n times out. A host event may also incur latency due to driver timeouts which must precede the event being transmitted. For example, if in certain implementations the sampling duration is 100 ms and if a fault occurs in the network 100 then the maximum time taken for the network to generate an event is 100 ms.

The monitoring application 110 collects events 204a . . . 204r occurring in the network 100 in blocks of time called time windows, where the duration of a time window equals the sampling duration 302. For example, if the sampling duration is 100 ms then the first time window is from 0 ms to 100 ms, the second time window is from 100 ms to 200 ms, the third time window is from 200 ms to 300 ms and so on. The current time window 306 is the current block of time in which the monitoring application 110 is collecting events 204a . . . 204r occurring in the network 100. The previous time window 304 is the block of time immediately preceding the current block for time. In certain implementations, the previous time window 304 and the current time window 306 are time intervals that are equal to the sampling duration 302. In FIG. 3, events 312a . . . 312q occur within the previous time window 304, and events 314a . . . 314y occur within the current time window 318. For example, if the current time window 306 is the second time window then events 312a . . . 312q may have occurred in the first time window, and events 314a . . . 314y may have occurred in the second time window.

The policy rules for fault factors 308 indicate the rules that are applied to determine at least one factor 200a . . . 200k that is the root cause for events 204a . . . 204r that occur in the previous time window 304 and the current time window 306. The policy rules for fault factors 308 may be based on various rules, including rules for determining which switches 106a . . . 106p have shared connections between them, which components share power supplies or power sources, the configuration of the network 100, etc. The policy rules for fault factors 308 may include rules for applying various fault signature algorithms and correlating the output of the fault signature algorithms.

The root cause factors 310 is one or more factors that are determined by the monitoring application 110 as being the root cause of a fault in the network 100. The root cause of a fault in the network 100 may propagate the fault to a plurality of components 202a . . . 202w and generate the plurality of events 204a . . . 204r. The root cause factors 310 may be returned by the monitoring application 110 to an user or may be saved in a log file.

Therefore, FIG. 3 shows how the monitoring application 110 may determine the root cause factors 310 corresponding to events 312a . . . 312q and events 314a . . . 314y received by the monitoring application 110 in the current time window 306 and the previous time window 304.

Figure 4:
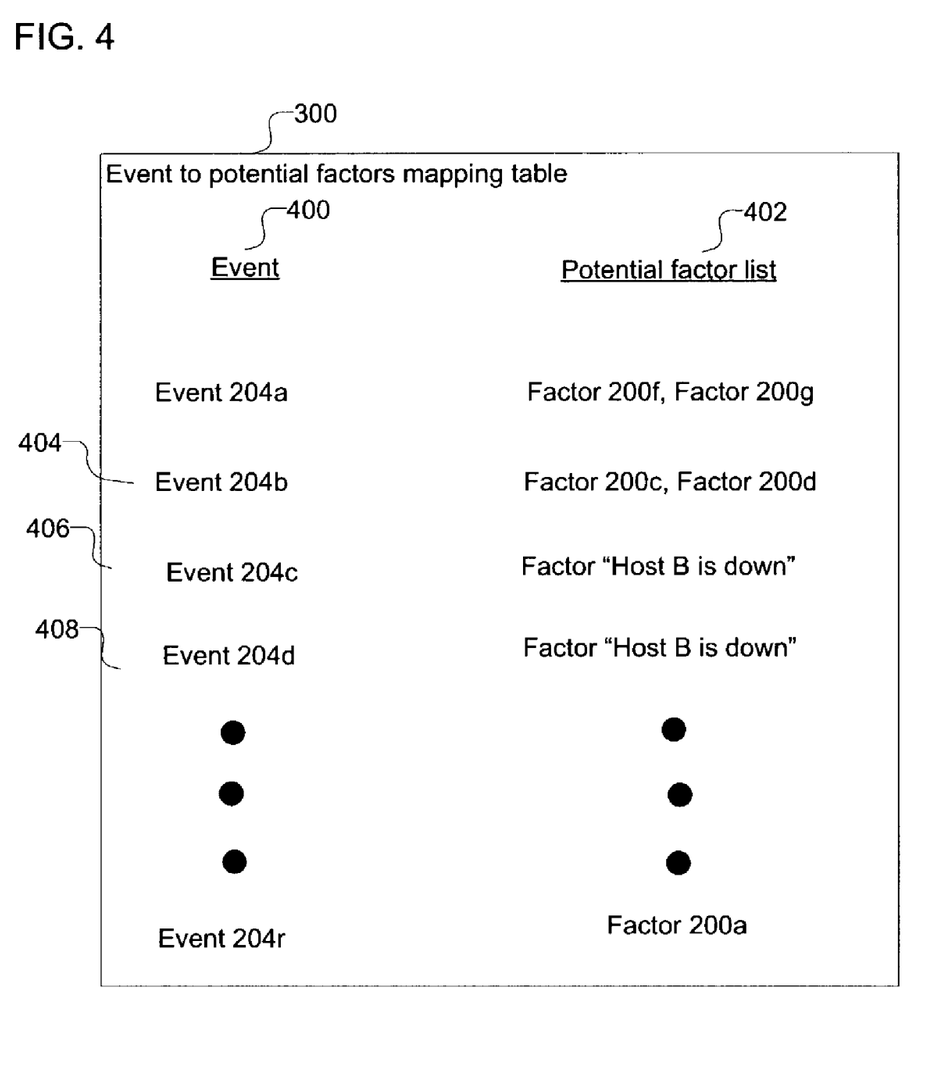
FIG. 4 illustrates a block diagram of an event to potential factors mapping table, in accordance with certain described implementations of the invention.

FIG. 4 illustrates a block diagram of the event to potential factors mapping table 300, in accordance with certain described implementations of the invention. The event to potential factors mapping table 300 maps every event 400 occurring in the network 100 to a potential factor list 402. For example, a second data row 404 of the event to potential factors mapping table 300 indicates that corresponding to event 204b the factors are factor 200c and factor 200d.

The event to potential factors mapping table 300 is constructed from past experience with the operation of the network 100 as well as from domain knowledge related to the events 204a . . . 204r, factors 200a . . . 200k, components 200a . . . 202, interconnections, and software of the network 100. For example, from prior experience it may be known that event 204a may be caused when there is a fluctuation in the power supply in the room housing the network 100, i.e., by factor 200f, or when there is an increase in temperature beyond a certain threshold, i.e., by factor 200g. In such a case, the event to potential factors mapping table 300 would have the factors 200r and 200g in the potential factor list 402 corresponding to the event 204a.

As an additional illustrative example, consider three hosts A, B, and C in the network 100 where host A is coupled to host B and host B is coupled to host C. Host A may generate an event 204c caused by factor "host B is down" (third data row 406) indicating a fault in host B and host C may generate an event 204d caused by factor "host B is down" (fourth data row 408) indicating a fault in host B, thereby allowing the monitoring application 110 to conclude from received events 204c and 204d that host B is a root cause of a failure in the network 100. In certain implementations, the events 400 may be dependent or independent of the components 200a . . . 200w in the network 100. The events 400 may be caused by any of the factors in the potential factor list 402.

The event to potential factors mapping table 300 may be updated periodically as new knowledge is gathered about the operation of the network 100. However, the event to potential factors mapping table 300 may be predetermined when the monitoring program 110 is operating in the network 100.

Therefore, FIG. 4 shows that the event to potential factors mapping table 300 includes for an event 204a . . . 204r the potential factor list 402 that can cause the event 204a . . . 204r in the network 100.

Figure 5:
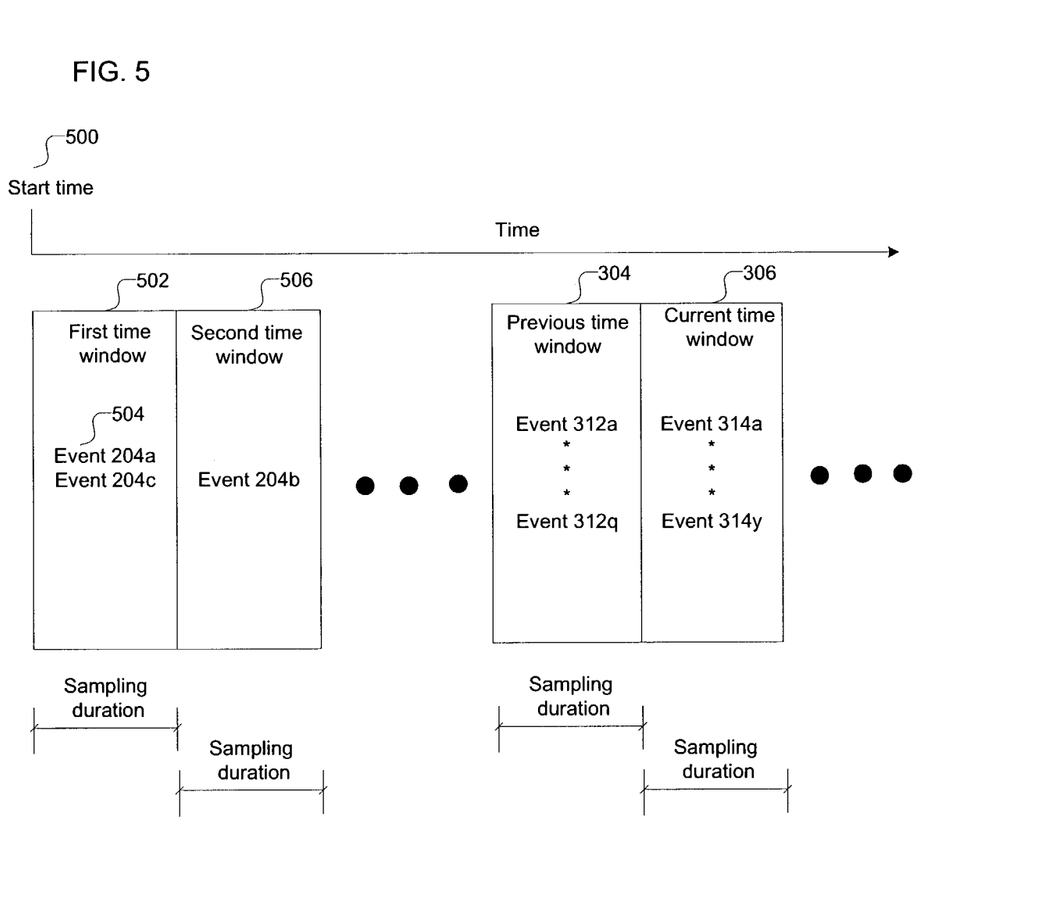
FIG. 5 illustrates a block diagram of a sequence of time windows, in accordance with certain described implementations of the invention.

FIG. 5 illustrates a block diagram of a sequence of time windows in which the monitoring application 110 collects events 204a . . . 204r occurring in the network 100, in accordance with certain described implementations of the invention. The monitoring application 110 starts operating from a start time 500 and collects the events occurring in a first time window 502. The time interval of the first time window 502 and each subsequent time window is at least equal to the sampling duration 302. In the example illustrated in FIG. 5, the monitoring program 110 may determine that events 204a and 204c occur in the first time window 502. The monitoring program 110 thereafter proceeds to collect events occurring in the second time window 506 and so on. When the monitoring application 110 collects events occurring in the current time window 306, the monitoring application 110 has already collected events that occurred in a previous time window 304.

The duration of any two consecutive time windows is at least twice the sampling duration 302. The sampling duration 302 represents the maximum time interval within which an event 204a . . . 204r is generated in the network 100. If a fault occurs in the network 100 then a corresponding event 204a . . . 204r is received by the monitoring application 110 within at least two consecutive time windows. Therefore, by aggregating events in two consecutive time windows no fault is missed by the monitoring application 110. Therefore, the monitoring application 110 can collect all faults in the network 100 by collecting the events 312a . . . 312q and the events 314a . . . 314y that occur in the previous time window 304 and the current time window 306.

Therefore FIG. 5 shows how the monitoring application 110 applies two consecutive time windows to collect events that include a fault generated in the network 100.

Figure 6:
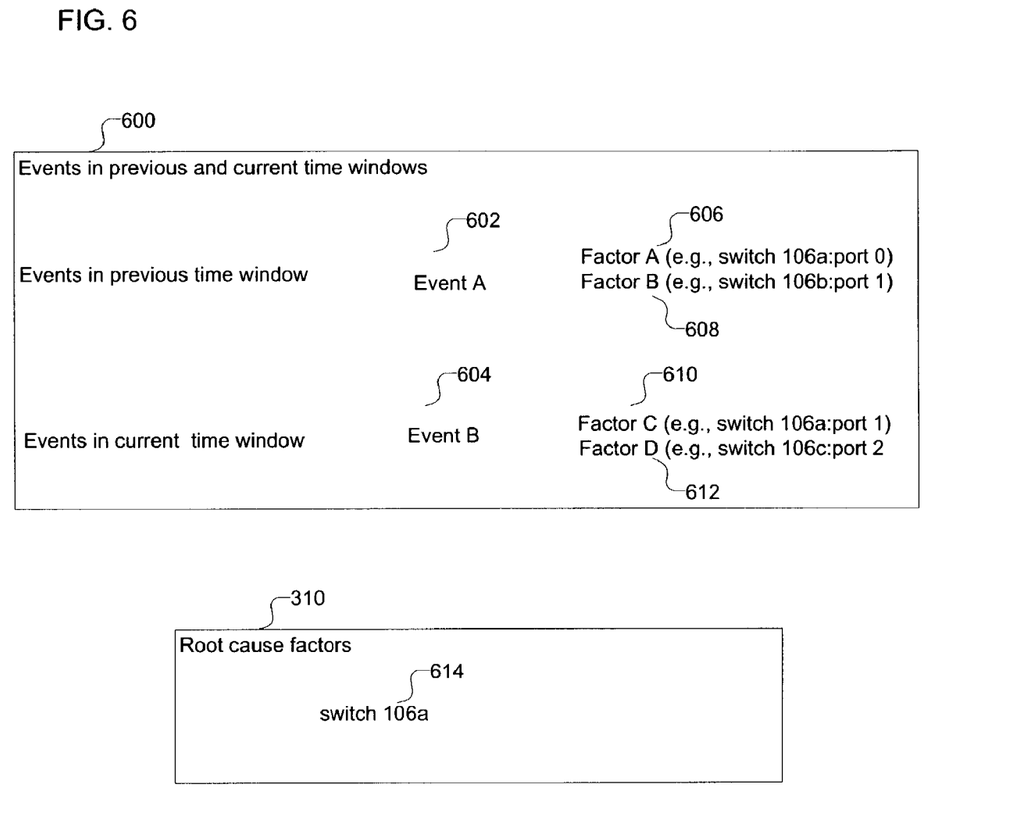
FIG. 6 illustrates a block diagram of an exemplary set of events and a root cause factor, in accordance with certain described implementations of the invention.

FIG. 6 illustrates a block diagram of an exemplary set of events occurring in two consecutive time windows in the network 100 and an exemplary root cause factor 310, in accordance with certain described implementations of the invention. The monitoring application 110 receives an event A 602 in the previous time window 304 and receives an event B 604 in the current time window 306. The monitoring application 110 may, from the event to potential factors mapping table 300, determine that event A 602 is caused by factor A 606 and factor B 608, and event B 604 is caused by factor C 610 and factor D 612. In certain implementations, factor A 606 may be a defect in port zero of switch 106, factor B 608 may be a defect in port 1 of switch 106*b*, factor C 610 may be a defect in port 1 of switch 106*a*, and factor D 612 may be a defect in port two of switch 106*c*.

In certain implementations, the monitoring application 110 may apply the policy rules for fault factors 308 to the determined factors A, B, C, and D (reference numerals 606, 608, 610, 612 respectively) and determine that switch 106*a* (reference numeral 614) is the component that is a likely cause of a fault in the network 100 that has occurred during the previous time window 304 and the current time window 306. Switch 106*a* (reference numeral 614) is common in factors for event A 602 and factors for event B 604, where event A 602 and event B 604 have been collected by the monitoring application 110 in the previous time window 304 and the current time window 306.

The monitoring application 110 indicates that the root cause factor 310 is the switch 106*a* (reference numeral 614). In certain implementations, the monitoring application 110 may also indicate that the switch 106*a* (reference numeral 614) was determined from event A 602 and event B 604.

Figure 7:
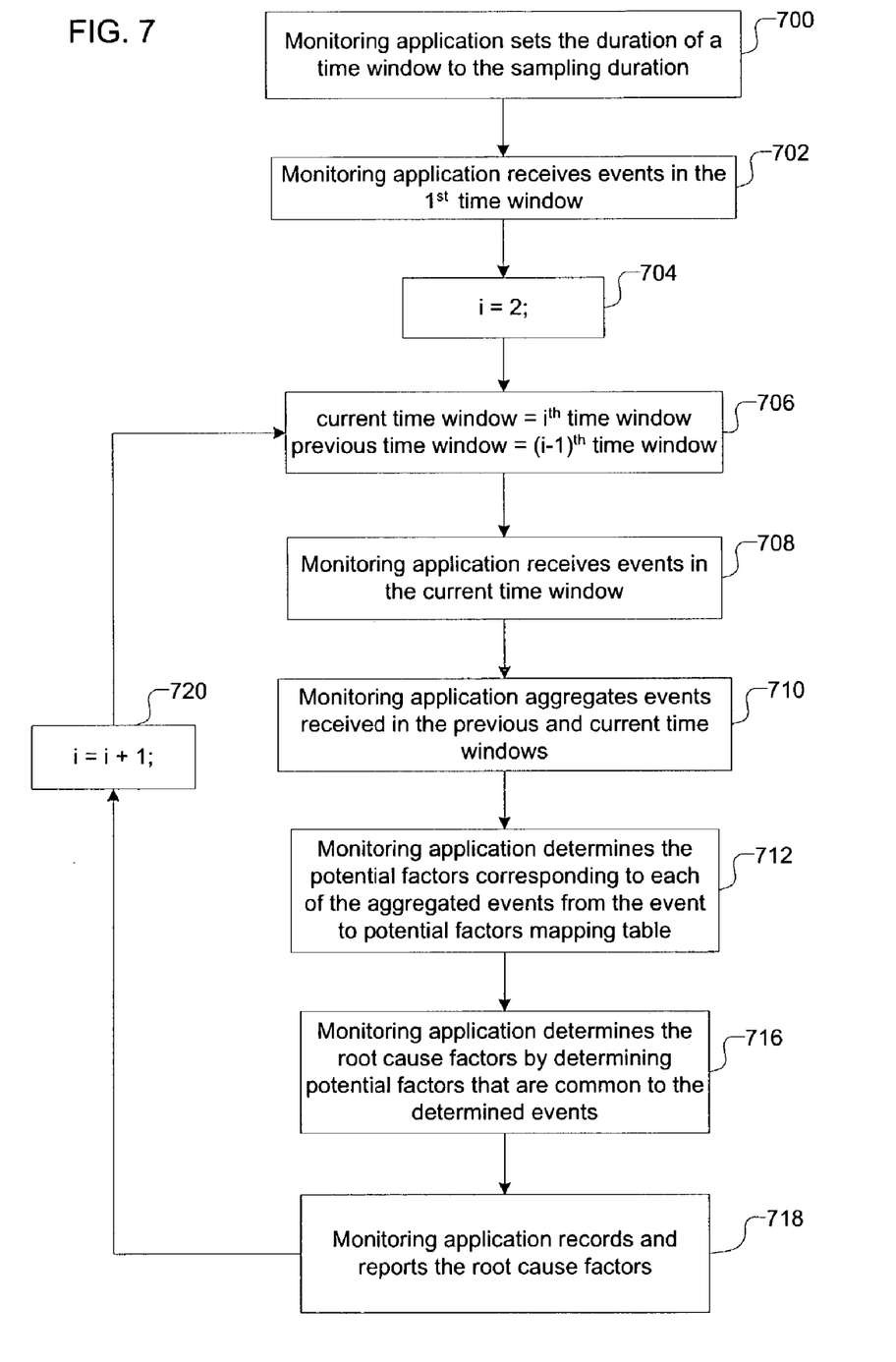
FIG. 7 illustrates a first logic for fault factor determination, in accordance with certain described implementations of the invention.

FIG. 7 illustrates a first logic for fault factor determination implemented in the monitoring application 110, in accordance with certain described implementations of the invention.

The logic starts at block 700 where the monitoring application 110 sets the duration of a time window to the sampling duration 302. Control proceeds to block 702 where the monitoring application 110 receives events 204*a* . . . 204*r* in a first time window 502.

Control proceeds to block 704, where the monitoring application 110 sets an integer variable i to two. The integer variable i indicates the number of the current time window. For example, if the monitoring application 110 is receiving events in the fifth time window the integer variable i is five.

Control proceeds to block 706, where the monitoring application 110 sets the current time window 306 to be the $i^{th}$ time window and the previous time window 304 to be the $(i-1)^{th}$ time window. At block 708, the monitoring application 110 receives events 314*a* . . . 314*y* occurring in the current time window 306. Control proceeds to block 710 where the monitoring application 110 aggregates events 312*a* . . . 312*q*, 314*a* . . . 314*y* received in the previous time window 304 and the current time window 306.

Control proceeds to block 712, where the monitoring application 110 determines the potential factors 200*a* . . . 200*k* corresponding to the determined events 312*a* . . . 312*q*, 314*a* . . . 314*y* from entries in the event to potential factors mapping table 300.

Control proceeds to block 716, where the monitoring application 110 determines the root cause factors 310 by determining at least one factor included in the potential factors 200*a* . . . 200*k* that are common in the determined events 312*a* . . . 312*q*, 314*a* . . . 314*y*. The determination of the root cause factors 310 from potential factors 200*a* . . . 200*k* may be performed in alternative ways and may depend on the policy rules for fault factors 308. Correlating a group of factors to determine a single factor may be performed by any event correlation technique.

Control proceeds to block 718, where the monitoring application 110 records and reports the root cause factors 310. The monitoring application 110 may notify a user or an automated system of the root cause factors 310. In certain implementations the monitoring application 110 may save the root cause factors 310 in a log file.

Control proceeds to block 720, where the monitoring application 110 increments the integer variable i. At the conclusion of block 720, control returns to block 706 and the monitoring application 110 keeps repeating the logic of blocks 706-720.

According to the logic of FIG. 7 the monitoring application 110 determines the factors responsible for the events occurring in two consecutive time windows, where each time window is at least of a time duration equal to the sampling duration. The monitoring application 110 analyzes the factors responsible for the events and determines the root cause factors 310.

Figure 8:
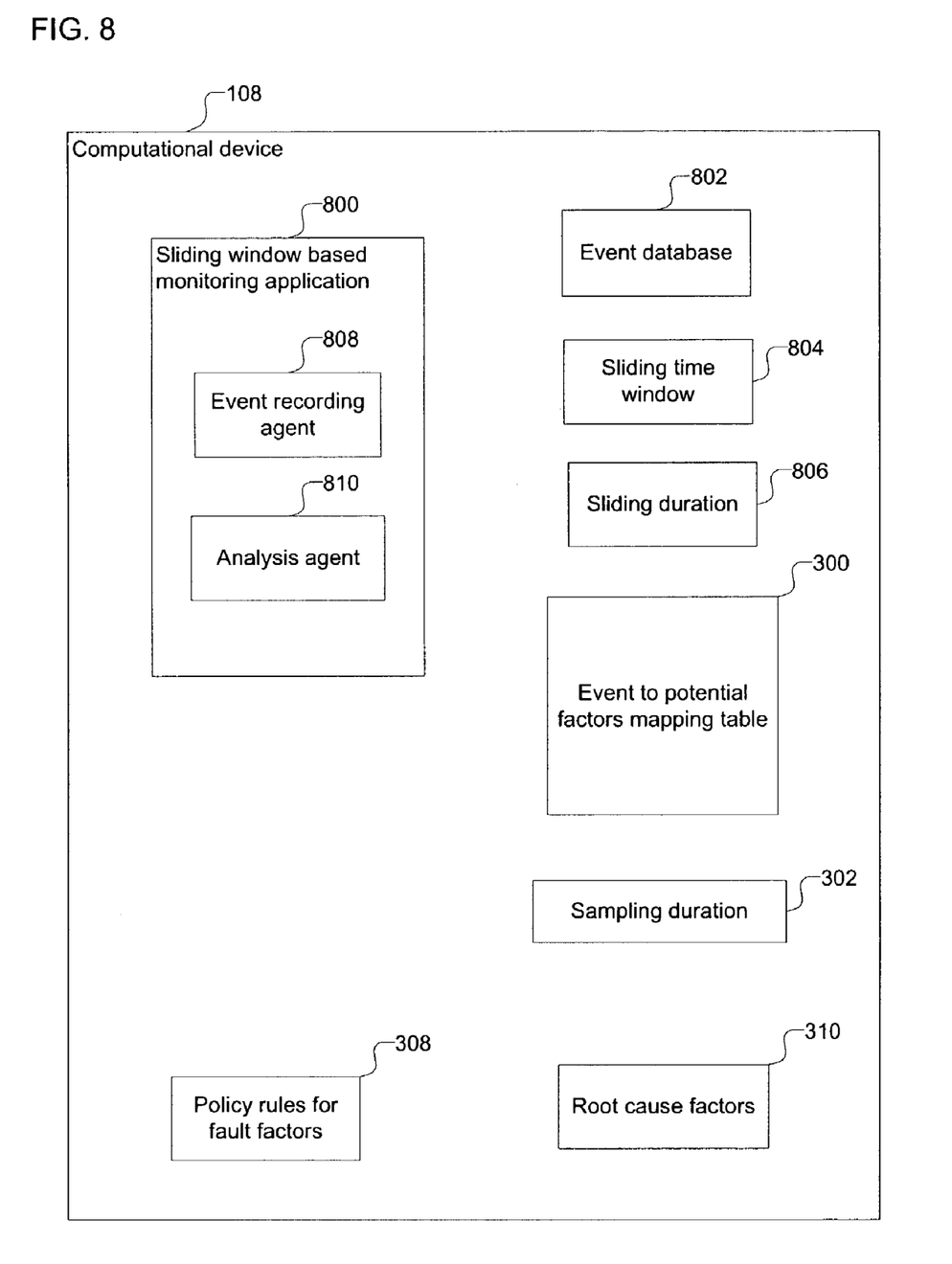
FIG. 8 illustrates a block diagram of data structures coupled to a sliding window based monitoring application, in accordance with certain described implementations of the invention.

FIG. 8 illustrates a block diagram of data structures coupled to a sliding window based monitoring application 800 implemented in the computational device 108, where the sliding window based monitoring application 800 is one implementation of the monitoring application 110, in accordance with certain implementations of the invention.

The computational device 108 comprises the sliding window based monitoring application 800, an event database 802, and data structures that implement a sliding time window 804 and a sliding duration 806. The computational device 108 may also include the event to potential factors mapping table 300, the sampling duration 302, the root cause factors 310 and the policy rules for fault factors 308.

The sliding window based monitoring application 800 includes an event recording agent 808 and an analysis agent 810. The event recording agent 808 records the events 204*a* . . . 204*r* in the event database 802 as the events 204*a* . . . 204*r* are received by the sliding window based monitoring application 800.

The analysis agent 810 analyzes the events 204*a* . . . 204*r* recorded in the event database 802 by the event recording agent 808. To perform the analysis, the analysis agent 810 aggregates and analyzes the events that have been received within a time interval that corresponds to the sliding time window 804. In certain implementations, the analysis agent 810 then shifts the sliding time window 804 by the sliding duration 806 to aggregate and analyze a new set of events. In alternative implementations, the analysis agent 810 chooses a new sliding time window 804 independent of the sliding duration 806.

Therefore, the sliding window based monitoring application 800 records the events 204*a* . . . 204*r* in the event database 802, and subsequently analyzes the events 204*a* . . . 204*r* by selecting events that occur within the sliding time window 804.

Figure 9:
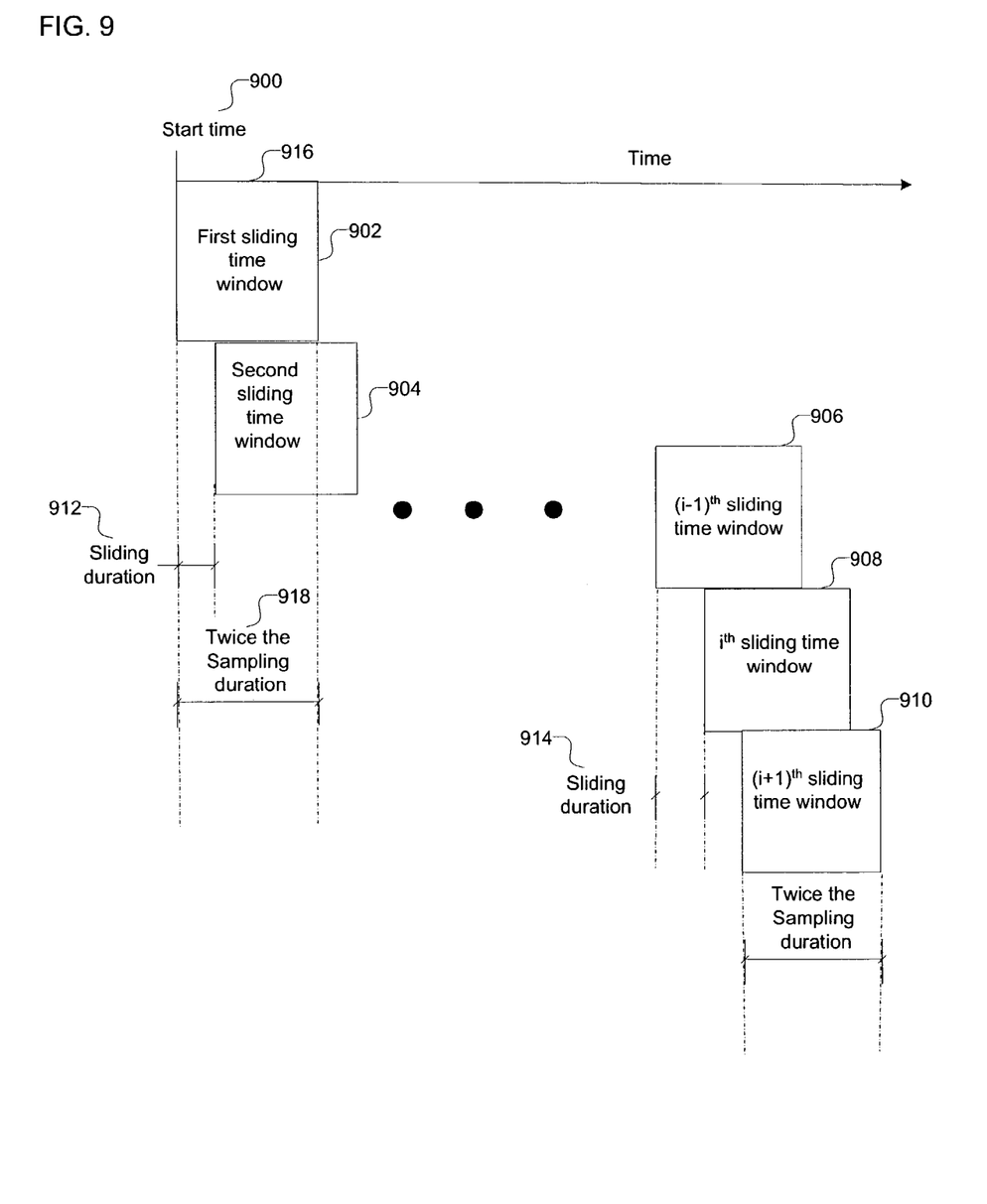
FIG. 9 illustrates a block diagram of a sequence of sliding time windows, in accordance with certain described implementations of the invention.

FIG. 9 illustrates a block diagram of a sequence of sliding time windows, in accordance with certain described implementations of the invention. FIG. 9 illustrates a block diagram of a sequence of sliding time windows in which the analysis agent 810 coupled to the sliding window based monitoring application 800 analyzes the events 204*a* . . . 204*r* occurring in the network 100, in accordance with certain described implementations of the invention.

The analysis agent 810 starts operating from a start time 900 and collects from the event database 802 the events that have occurred in a first sliding time window 902. FIG. 9 illustrates four additional sliding time windows: a second sliding time window 904, an $(i-1)^{th}$ time window 906, an $i^{th}$ time window 908, and an $(i+i)^{th}$ time window 910. The duration of any sliding time window 804 is at least equal to a time interval that is twice the sampling duration 302.

The sampling duration 302 represents the maximum time interval within which an event 204*a* . . . 204*r* is generated by any factor 200a . . . 200k of the network 100. Therefore if the sliding time window 804 is at least equal to a time interval that is twice the sampling duration 302 then the sliding time window 804 does not miss aggregating any fault that occurs at a time that is centered on the sliding time window 804. For example, the first sliding time window 902 is centered at time 916 and has a duration that is twice the sampling duration 918 and therefore the first sliding time window 902 analyzes all faults within the network 100 that occurs at time 916.

Any two consecutive sliding time windows are separated by a time interval equal to the sliding duration 806. For example, the sliding duration 912 between the first sliding time window 902 and the second sliding time window 904 is equal to the sliding duration 806, and the sliding duration 914 between the $(i-1)^{th}$ time window 906 and the $i^{th}$ time window 908 is also equal to the sliding duration 806.

In the example illustrated in FIG. 9, the analysis agent 810 may determine the events that occur in the first sliding time window 902. The analysis agent thereafter may determine events occurring in the second time window 904 and so on.

Therefore FIG. 9 shows how the sliding window based monitoring application 800 applies a sliding time window to collect events from the event database 802 that include faults generated in the network 100.

Figure 10:
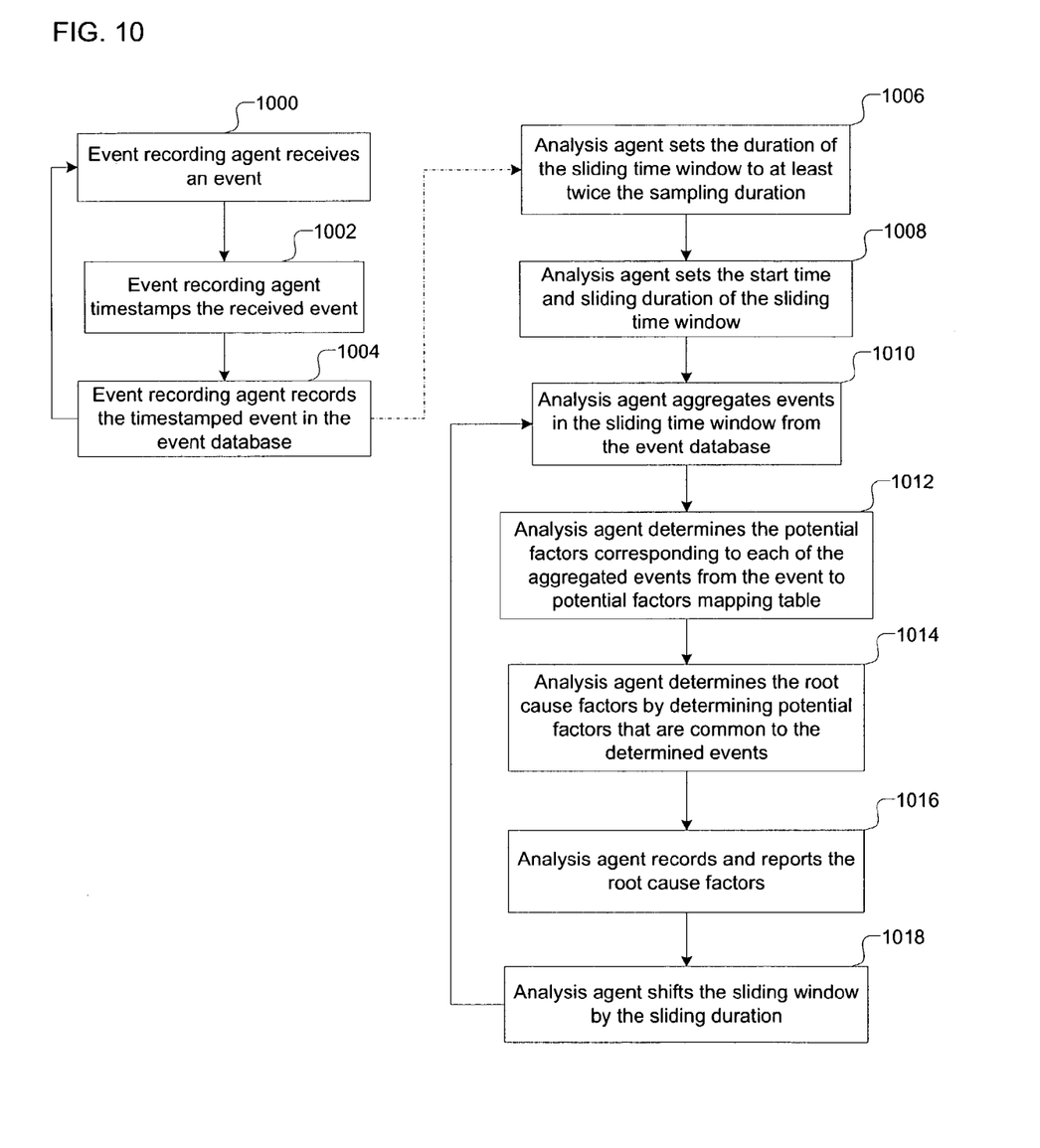
FIG. 10 illustrates a second logic for fault factor determination, in accordance with certain described implementations of the invention.

FIG. 10 illustrates a second logic for fault factor determination as implemented by the sliding window based monitoring application 800, in accordance with certain described implementations of the invention.

Control starts at block 1000 where the event recording agent 808 receives an event 204a . . . 204r that occurs in the network 100. Control proceeds to block 1002, where the event recording agent 808 timestamps the received event 204a . . . 204r. The event recording agent 808 records the timestamped event 204a . . . 204r in the event database 802 and return control to block 1000.

From block 1004 control may also proceed in parallel to block 1006 while the event recording agent is 804 is recording the events 204a . . . 204r or after some or all of the events 204a . . . 204r have been recorded in the event database 802. At block 1006 the analysis agent 810 sets the duration of the sliding time window 804 to at least twice the sampling duration 302. The analysis agent 810 sets (at block 1006) the start time 900 and sliding duration 806 of the sliding time window 804.

Control proceeds to block 1010 where the analysis agent 810 aggregates events received within the duration of the sliding time window 804 from the event database 802. For example, if events A, B, and C are three events in the event database 802 with timestamps lying between time T1 and time T2, and the sliding time window 804 spans the time interval between time T1 and T2 then the events aggregated by the sliding time window 804 may include the events A, B and C.

Control proceeds to block 1012, where the analysis agent 810 determines the potential factors in the potential factor list 402 corresponding to the aggregated events from entries in the event to potential factors mapping table 300.

Control proceeds to block 1014, where the analysis agent 810 determines the root cause fault factors 310 by determining at least one factor included in the potential factors that are common in the aggregated events. The determination of the root cause fault factors 310 from the list of potential factors may be performed in alternative ways and may depend on the policy rules for fault factors 308.

Control proceeds to block 1016, where the analysis agent 810 records and reports the root cause fault factors 310. The analysis agent 810 may notify a user or an automated system of the root cause fault factors 310. In certain implementations the analysis agent 810 may save the root cause fault factors 310 in a log file.

Control proceeds to block 1018, where the analysis agent 810 shifts the sliding time window 804 by the sliding duration 806. In certain alternative implementations, the sliding time window 804 may be centered on any other time rather than be shifted by the sliding duration 806. At the conclusion of block 1018, control returns to block 1010 and the analysis agent 810 keeps repeating the logic of blocks 1010–1018.

The logic of FIG. 10 may be implemented via two independently running processes: a first process implementing the logic of blocks 1000–1004 and a second process implementing the logic of blocks 1006–1018. Although blocks 1004 and 1006 are shown connected by a dotted line in FIG. 10 that does not imply that the first process has to complete before the second process is executed.

According to the logic of FIG. 10 the analysis agent 810 determines the factors responsible for the events occurring in a time window, where the time window is at least of a time duration that is twice the sampling duration. The sliding window based monitoring application 800 analyzes the factors responsible for the events and determines the root cause fault factors 310.

The implementations determine a factor that is the root or principal cause for faults that occur in a network. The implementations determine the likely factors that are the root or principal cause of faults in a network by using two consecutive time windows or a single sliding time window. Even when multiple events are generated as a result of a single fault, the implementations determine at least one factor that is the root cause for the multiple events. Multiple events may have been generated in the network as a result of a single fault because a single fault may propagate errors across multiple components of a network. The implementations may determine the root cause factor substantially at the same time as the corresponding events get generated or at a future time.

The described techniques may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium, such as magnetic storage medium (e.g., hard disk drives, floppy disks, tape, etc.), optical storage (CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code for the implementations may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Thus, the "article of manufacture" may comprise the medium in which the code is embodied. Additionally, the "article of manufacture" may comprise a combination of hardware and software components in which the code is embodied, processed, and executed. Of course, those skilled in the art will recognize that many modifications may be made to this configuration without departing from the scope of the present invention, and that the article of manufacture may comprise any information bearing medium known in the art.

Figure 11:
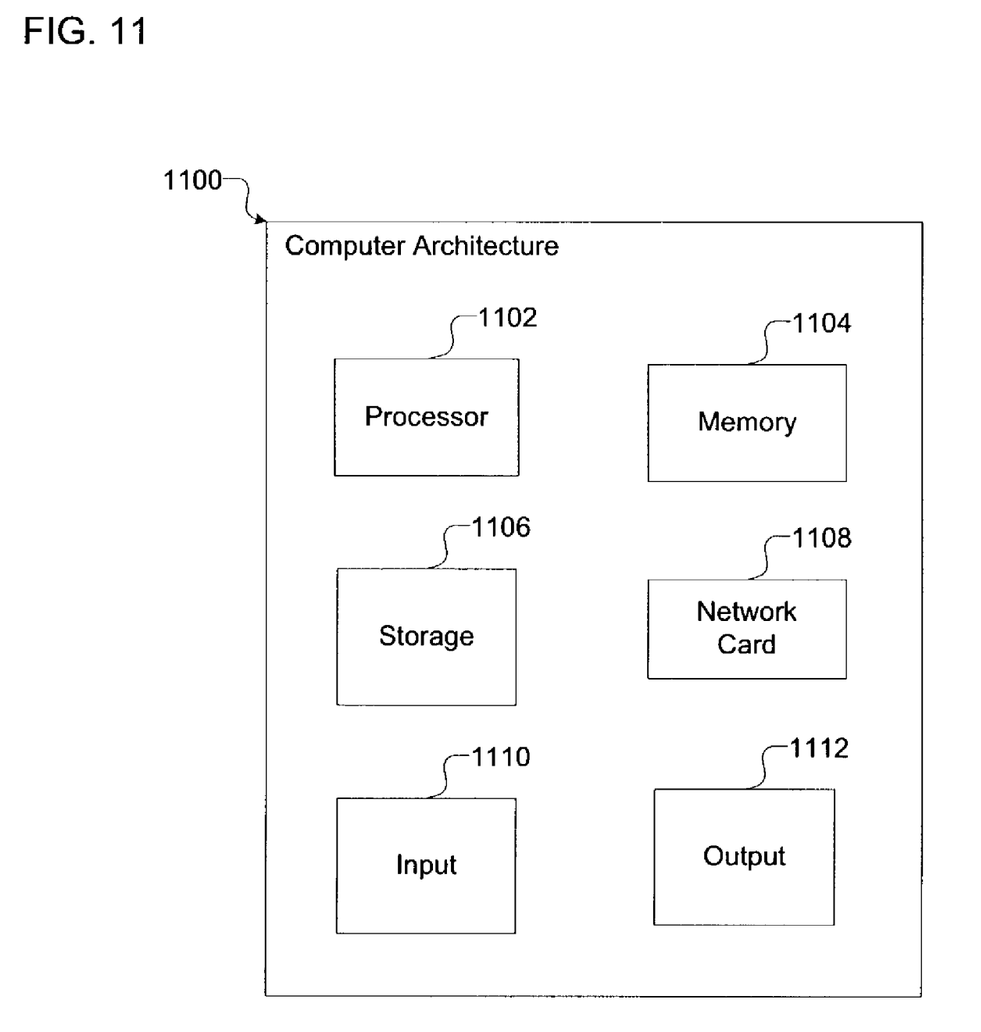
FIG. 11 illustrates a block diagram of a computer architecture in which certain described aspects of the invention are implemented.

FIG. 11 illustrates a block diagram of a computer architecture in which certain aspects of the invention are implemented. FIG. 11 illustrates one implementation of the hosts 102a . . . 102n and the computational device 108. The hosts 102a . . . 102n and the computational device 108 may implement a computer architecture 1100 having a processor 1102, a memory 1104 (e.g., a volatile memory device), and storage 1106 (e.g., a non-volatile storage, magnetic disk drives, optical disk drives, tape drives, etc.). The storage 1106 may comprise an internal storage device, an attached storage device or a network accessible storage device. Programs in the storage 1106 may be loaded into the memory 1104 and executed by the processor 1102 in a manner known in the art. The architecture may further include a network card 1108 to enable communication with a network. The architecture may also include at least one input 1110, such as a keyboard, a touchscreen, a pen, voice-activated input, etc., and at least one output 1112, such as a display device, a speaker, a printer, etc.

The logic of FIG. 7 and FIG. 10 describe specific operations occurring in a particular order. Further, the operations may be performed in parallel as well as sequentially. In alternative implementations, certain of the logic operations may be performed in a different order, modified or removed and still implement implementations of the present invention. Moreover, steps may be added to the above described logic and still conform to the implementations. Yet further steps may be performed by a single process or distributed processes.

The computational device 108 and the components of the network 100 may communicate within a client-server paradigm in the described implementations. In alternative implementation the computational device 108 may also communicate to the components of the network 100 within a peer-to-peer or any other paradigm known in the art. Furthermore, many of the software and hardware components have been described in separate modules for purposes of illustration. Such components may be integrated into a fewer number of components or divided into a larger number of components. Additionally, certain operations described as performed by a specific component may be performed by other components.

The data structures, applications, agents, and components show in FIGS. 1–11 are shown as having specific types of information. In alternative implementations, the data structures, agents, and components may be structured differently and have fewer, more or different fields, components or functions than shown in the figures. In certain figures alphabetical suffixes, such as a, b, c, etc., have been added to the end of reference numerals. For example, the hosts have been labeled with reference numerals 102a . . . 102n. The alphabetical suffixes may serve to denote one of a plurality of related elements, with no particular limitations of the number of the plurality of related elements.

Therefore, the foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many implementations of the invention can be made without departing from the spirit and scope of the invention, the invention resides in the claims hereinafter appended.

What is claimed is:

1. A method for fault determination, comprising:
determining a duration of time for receiving an event;
receiving a plurality of events in a time period that is at least twice the determined duration;
determining a plurality of factors corresponding to the plurality of events;
identifying at least one factor which is common to the plurality of factors; and
determining the at least one factor is a likely root cause of at least two of the plurality of events.

2. The method of claim 1, wherein the duration is a first duration, further comprising:
selecting at least one time window of a second duration, wherein the second duration is at least twice the first duration; and
identifying the received plurality of events in the at least one time window.

3. The method of claim 1, wherein the duration is a first duration, further compnsing:
assigning timestamps to the received plurality of events;
recording the timestamped events in a database; and
retrieving events from the database occurring in at least one time window, wherein the at least one time window is of a second duration, wherein the second duration is at least twice the first duration.

4. The method of claim 1, further comprising:
selecting at least two successive time windows, wherein each time window is at least of the duration; and
identifying the received plurality of events in the at least two successive time windows.

5. The method of claim 1, wherein the received plurality of events are in a current time window and a previous time window, wherein the current time window and the previous time window are each at least of the duration, the method further comprising:
subsequent to determining the at least one factor, receiving a new plurality of events in a next time window, wherein the next time window is at least of the duration, and wherein the next time window becomes a new current time window, and the current time window becomes a new previous time window.

6. The method of claim 1, wherein determining the plurality of factors further comprises: retrieving from a mapping data structure one list of factors corresponding to at least one event in the received plurality of events.

7. The method of claim 1, wherein determining the at least one factor further comprises: determining the at least one factor based on predetermined policies.

8. The method of claim 1, wherein the event is received from a device within the duration of time.

9. The method of claim 1, wherein the plurality of events are faults generated by factors in a network, wherein the receiving and determinations are performed by a monitoring application implemented in a computational device coupled to the network.

10. A system for fault determination, comprising:
a device configured to:
determine a duration of time for receiving an event;
receive a plurality of events in a time period that is at least twice the determined duration;
determine a plurality of factors corresponding to the plurality of events;

identify at least one factor which is common to the plurality of factors; and determine the at least one factor from the plurality of factors, is a likely root cause of at least two of the plurality of events.

11. The system of claim 10, wherein the duration is a first duration, and wherein the device is further configured to: select at least one time window of a second duration, wherein the second duration is at least twice the first duration; and identify the received plurality of events in the at least one time window.

12. The system of claim 10, wherein the duration is a first duration, and the device further a database; wherein the device is further configured to:

assign timestamps to the received plurality of events;

record the timestamped events in the database; and retrieve events from the database occurring in at least one time window, wherein the at least one time window is of a second duration, wherein the second duration is at least twice the first duration.

13. The system of claim 10, wherein the device is further configured to:

select at least two successive time windows, wherein each time window is at least of the duration; and identify the received plurality of events in the at least two successive time windows.

14. The system of claim 10, wherein the received plurality of events are in a current time window and a previous time window, wherein the current time window and the previous time window are each at least of the maximum duration, the device being further configured to:

receive a new plurality of events in a next time window subsequent to determining the at least one factor, wherein the next time window is at least of the maximum duration, and wherein the next time window becomes a new current time window, and the current time window becomes a new previous time window.

15. The system of claim 10, wherein the device is further configured to: retrieve from a mapping data structure one list of factors corresponding to at least one event in the received plurality of events.

16. The system of claim 10, wherein the device is further configured to: determine the at least one factor based on predetermined policies.

17. The system of claim 10, wherein the event is received within the duration of time.

18. The system of claim 10, further comprising:

a network, wherein the plurality of events are faults generated by factors in the network;

the device is coupled to the network; and a monitoring application implemented in the device.

19. An article of manufacture for fault determination, wherein the article of manufacture is capable of causing operations, the operations comprising:

determining a duration of time for receiving an event;

receiving a plurality of events in a time period that is at least twice the determined duration;

determining a plurality of factors corresponding to the plurality of events; and identifying at least one factor which is common to the plurality of factors; and determining the at least one factor from the plurality of factors is a likely root cause of at least two of the plurality of events.

20. The article of manufacture of claim 19, further comprising: selecting at least one time window of a second duration, wherein the second duration is at least twice the first duration; and identifying the received plurality of events in the at least one time window.

21. The article of manufacture of claim 19, further comprising:

assigning timestamps to the received plurality of events;

recording the timestamped events in a database; and retrieving events from the database occurring in at least one time window, wherein the at least one time window is of a second duration, wherein the second duration is at least twice the first duration.

22. The article of manufacture of claim 19, further comprising: selecting at least two successive time windows, wherein each time window is at least of the duration;

and identifying the received plurality of events in the at least two successive time windows.

23. The article of manufacture of claim 19, wherein the received plurality of events are in a current time window and a previous time window, wherein the current time window and the previous time window are each at least of the maximum duration, the operations further comprising: subsequent to determining the at least one factor, receiving a new plurality of events in a next time window, wherein the next time window is at least of the maximum duration, and wherein the next time window becomes a new current time window, and the current time window becomes a new previous time window.

24. The article of manufacture of claim 19, wherein determining the plurality of factors further comprises: retrieving from a mapping data structure one list of factors corresponding to at least one event in the received plurality of events.

25. The article of manufacture of claim 19, wherein determining the at least one factor further comprises: determining the at least one factor based on predetermined policies.

26. The article of manufacture of claim 19, wherein the event is received from a device within the duration of time.

27. The article of manufacture of claim 19, wherein the plurality of events are faults generated by factors in a network, wherein the receiving and determinations are performed by a monitoring application implemented in a computational device coupled to the network.

* * * * *